United States Patent
Berto (10) Patent No.: US 7,486,039 B2
(45) Date of Patent: Feb. 3, 2009

(54) METHOD FOR DETERMINING THE BACK ELECTROMOTIVE FORCE INDUCED IN A VOICE-COIL MOTOR DRIVEN IN DISCONTINUOUS MODE

(75) Inventor: Michele Boscolo Berto, Chioggia (IT)

(73) Assignee: STMicroelectronics, S.r.l., Agrate Brianza (MI) (IT)

( * ) Notice: Subject to any disclaimer, the term of this patent is extended or adjusted under 35 U.S.C. 154(b) by 79 days.

(21) Appl. No.: 11/567,413

(22) Filed: Dec. 6, 2006

(65) Prior Publication Data

US 2007/0164694 A1 Jul. 19, 2007

(30) Foreign Application Priority Data

Dec. 7, 2005 (IT) .......................... VA2005A0069

(51) Int. Cl.
*H02P 6/18* (2006.01)
(52) U.S. Cl. .................... 318/400.34; 318/459; 360/75; 360/78.06
(58) Field of Classification Search ................. 318/459, 318/78, 400.34; 360/75, 78.06
See application file for complete search history.

(56) References Cited

U.S. PATENT DOCUMENTS

| | | | | |
|---|---|---|---|---|
| 5,455,723 A | * | 10/1995 | Boutaghou et al. ............ 360/75 |
| 6,542,324 B1 | * | 4/2003 | Galbiati et al. ................ 360/75 |
| 6,788,490 B2 | | 9/2004 | Schillaci et al. .......... 360/78.04 |
| 7,327,103 B1 | * | 2/2008 | El-Sadi ........................ 318/34 |
| 2002/0054451 A1 | * | 5/2002 | Moon et al. ............... 360/78.06 |
| 2003/0102834 A1 | * | 6/2003 | Hussein ..................... 318/439 |
| 2004/0027088 A1 | * | 2/2004 | Abe et al. ................... 318/650 |

\* cited by examiner

*Primary Examiner*—Walter Benson
*Assistant Examiner*—Antony M Paul
(74) *Attorney, Agent, or Firm*—Lisa K. Jorgenson; Allen, Dyer, Doppelt, Milbrath & Gilchrist, P.A.

(57) ABSTRACT

A method to determine a back electromotive force induced in a coil of a voice-coil motor by its motion. The motor is driven in a discontinuous mode by commanding alternating on-phases and off-phases (tristate). A drive current flowing in the coil or a drive voltage on the coil at an end of an on-phase is sensed. An amplitude of a voltage disturbance induced in the coil by mutual induction between a permanent magnet of the voice-coil motor and the moving coil as a function of the sensed drive current or drive voltage is estimated. Voltage on the coil is sensed during a following off-phase with no current flowing in the coil. The back electromotive force induced in the moving coil is determined as a difference between the sensed voltage and the estimated amplitude of the voltage disturbance.

33 Claims, 9 Drawing Sheets

METHOD FOR DETERMINING THE BACK ELECTROMOTIVE FORCE INDUCED IN A VOICE-COIL MOTOR DRIVEN IN DISCONTINUOUS MODE

FIELD OF THE INVENTION

The invention relates in general to electric motors, and more particularly, to a method of sensing the back electromotive force (BEMF) induced in a coil of a voice-coil motor (VCM) or of any other electromechanical actuator of the voice coil type for improving control of the speed.

BACKGROUND OF THE INVENTION

Voice coil motors, or more shortly VCMs, are widely used in many applications. They are substantially composed of a coil immersed in a magnetic field generated by a permanent magnet. By forcing through the coil a certain current, forces that displace the coil are generated. This displacement of the coil may be controlled accurately.

Besides VCMs, there are other electromechanical actuators that work by exploiting this principle, such as audio loudspeakers, electro-locking systems and the like. Because of the importance of VCMs, hereinafter reference will be made only to these kinds of motors, but the same observations hold for any voice-coil type of actuator.

VCMs are used for displacing the arm that carries the read/write head(s) from a working position overhanging a spinning disk to a safe parking position on a ramp (ramp unloading), and vice-versa (ramp loading).

The ramp unloading operation of the read/write operations is essential for preventing possible damage to the disk or to the head(s) because during transportation, the suspension arm is subject to vibrations and the heads could hit the surface of the disk damaging it and/or themselves. The opposite operation is the ramp loading and it is carried out each time the hard disk is enabled for reading from or writing data on it.

It is important that the speed of rotation of the mechanical arm be controlled during these operations for preventing possible damage to the heads when the arm reaches the run stop at the end of the parking ramp, or when the heads are brought to and held over selected tracks of the spinning disk.

Ramp loading and ramp unloading operations are controlled by a control circuit for the speed of the mechanical arm, moved by a VCM. According to a control technique for the speed of a VCM, the instantaneous speed of the mechanical arm may be measured using optical encoders, as disclosed in U.S. Pat. No. 5,455,723.

Notably, the speed of the mechanical arm may also be measured by sensing the back electromotive force (BEMF) induced in the motor coil by the motion of the arm. The back electromotive force induced by the motion of the arm is proportional to the speed of the arm.

A method and a circuit for measuring a back electromotive force are disclosed in U.S. Pat. No. 6,788,490, which is assigned to the current assignee of the present invention and is incorporated herein by reference in its entirety. The circuit generates an estimated value of the BEMF as a function of the current flowing through a coil of a magnetic actuator, measured on a current sensing resistor.

This technique is hardly appropriate for sensing the back electromotive force in VCMs controlled in a PWM or PSM mode. This is because the signal/noise ratio is generally too low for ensuring a sufficiently precise control of the speed.

The back electromotive force may be reliably measured by sensing the voltage on the nodes of the coil of the motor when the motor is in a tristate state. This is according to a technique disclosed in U.S. Pat. No. 6,542,324, which is assigned to the current assignee of the present invention and is incorporated herein by reference in its entirety.

When operating in a discontinuous mode, the stage that drives the motor alternates conduction intervals, during which the motor is connected to the power supply rail, to off intervals, during which the motor is in a high impedance state, i.e., tristated. $T_{ON}$ is the duration of a conduction phase, and $T_{OFF}$ is the duration of an off phase in which the motor is tristated. For a time $T_{OFF}$ no current is flowing and the voltage drop on the nodes of the motor is equal to the back electromotive force (BEMF). An operational amplifier senses the back electromotive force induced in the coil of the VCM by sensing the voltage on its nodes when the switches of the driving stage are open.

A drawback of this technique is in the need to wait for a minimum time, $T_{OFFMIN}$, before the voltage on the nodes of the motor approximates with sufficient accuracy the induced back electromotive force BEMF. Tests carried out on a real VCM demonstrated that, starting from the instant in which the motor is tristated, there is a transient component of the voltage on the nodes of the motor that alters the BEMF sensing.

Figure 2:
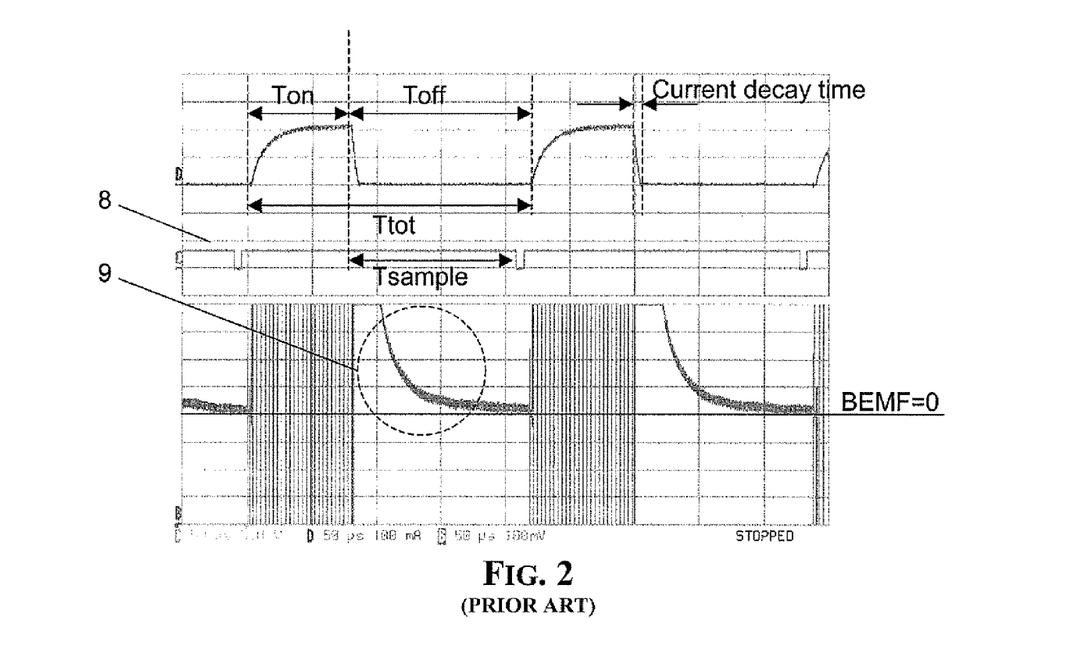
FIG. 2 shows the main signals of the circuit of FIG. 1 when driving the VCM in a discontinuous mode.

This effect may be clearly noticed from the graphs of FIG. 2 that show sensed waveforms of the currents and of the voltages on the positive and negative nodes during the time intervals $T_{ON}$ and $T_{OFF}$. This is in two different driving conditions of the VCM. These diagrams were obtained by blocking the moving arm of the VCM for highlighting such a voltage disturbance. Thus, the voltage sensed on the coil decays exponentially and is the voltage disturbance.

When the current transient finishes, there persists a transient of a voltage disturbance yet to decay completely, highlighted by the dashed circle 9. Such a persistent disturbance typically lasts several tenths of a microsecond, and its duration depends upon the current that has been flowing in the coil during the precedent conduction phase. This can significantly fault the sensing of the BEMF. When the microprocessor μP of FIG. 1 generates a pulse 8 for activating the analog-to-digital converter ADC, the latter samples the voltage on the coil.

To sense correctly the BEMF induced in the coil of the VCM, it is necessary that the motor be tristated for a minimum time, $T_{SAMPLE}$, long enough to let the voltage transient finish. This phenomenon limits the frequency of the control signals of the switches of the driving stage, and as a consequence, the precision of control of the speed of the motor. Moreover, this frequency typically ranges between 1 kHz and 3 kHz. Therefore, noise at audible frequencies is generated.

SUMMARY OF THE INVENTION

An object of the invention is to sense the BEMF induced in a VCM while increasing the frequency of the control signals of the driving stage above the band of audible frequencies.

The transient voltage disturbance is due to the fact that in a tristate state, the VCM acts as a transformer. The secondary coil of which is the permanent magnet of the VCM. This voltage disturbance, detected when the motor is tristated, could be due to the variation of magnetic flux generated by the permanent magnet of the VCM because of the perturbation induced by the current flowing through the coil. Substantially, this phenomenon could be explained as the effect of a mutual inductance between the coil and the permanent magnet of the VCM.

From this assumption, a method has been devised for estimating the value of the voltage disturbance at the instant the current flowing through the coil becomes null upon entering a tristate phase. Therefore, it is no longer necessary to wait for this transient voltage to decay completely for reliably sensing the back electromotive force induced in the coil by the motion of the VCM. As a result, it is possible to reduce the turn off time, $T_{OFF}$, and thus increase the drive frequency above the audible frequency band.

The voltage disturbance is estimated as a function of the current flowing through the coil or of the voltage on the coil at the end of the immediately preceding on-phase.

According to one embodiment, after a variation of the current or of the voltage on the coil at the end of the on-phase in respect to the preceding on-phase, by an absolute value exceeding a certain threshold, the back electromotive force is considered constant for a certain number N of off-phases after the present on-phase by the control system. This may be done by disabling the sensing of the voltage on the coil during these N off-phases.

According to a method of discontinuous mode driving of the coil of a voice-coil motor, the amplitude of a current pulse to be forced in the coil during an on-phase is determined as a function of the back electromotive force detected on the nodes of the coil during the preceding tristate phase.

According to another aspect of the invention, the back electromotive force is considered constant for a number N of off-phases following the current on-phase if a variation of the current or of the voltage has occurred at the end of the current on-phase in respect to the previous on-phase, and the absolute value of such a variation exceeds a certain threshold.

BRIEF DESCRIPTION OF THE DRAWINGS

The invention is described referring to the attached drawings, wherein.

DETAILED DESCRIPTION OF THE PREFERRED EMBODIMENTS

Figure 1:
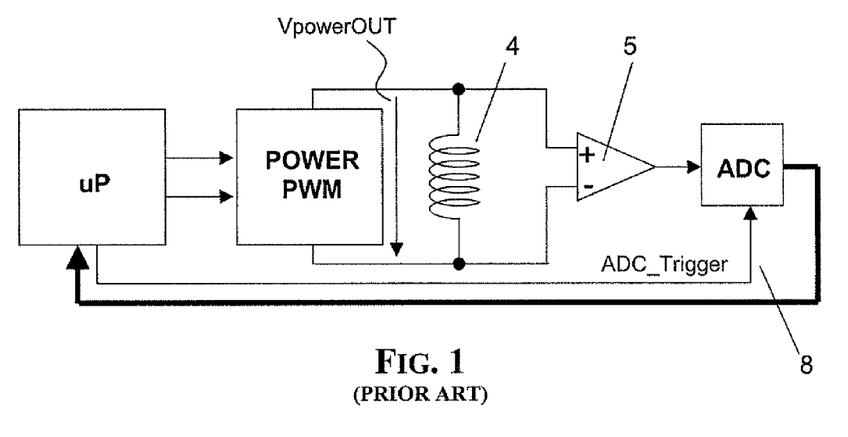
FIG. 1 schematically shows a common driving circuit of a VCM according to the prior art.

As described above, when the VCM is controlled in a discontinuous mode, the current nullifies completely during tristate phases, thus permitting the back electromotive force to be sensed on the nodes of the coil 4 of the VCM with the operational amplifier 5, as depicted in FIG. 1.

It is possible to estimate the amplitude of the voltage disturbance continuing after nullification of the drive current in the coil as a function of the current flowing through the coil at the end of the on-phase. As a consequence, the back electromotive force can be estimated as a difference between the voltage sensed on the nodes of the coil when the current flowing therethrough nullifies, and the voltage disturbance.

It is not strictly necessary to carry out a direct measurement of the current flowing through the coil, which takes place only when the motor is controlled in a current mode. Indeed, the technique of the invention is effective even if the VCM is controlled in a voltage mode, whereby direct measurement of the current flowing through the coil is not carried out. In such a case, it is possible to estimate this current as the expected current value in correspondence of the actual values assumed by driving signals of the motor. In an alternative approach, it is easier to sense the voltage on the coil, that is, substantially proportional to the current flowing therethrough.

Hereinafter, reference will be made to the case in which the current flowing through the coil is sensed at the end of an on-phase (current mode control), but what will be stated holds even if the current is estimated as a function of the values assumed by driving signals of the motor or as a function of the voltage sensed on the coil.

The main advantage of estimating the voltage disturbance is that it is possible to determine the back electromotive force induced in the coil, generated by the motion of the arm driven by the VCM, without waiting that the voltage disturbance nullifies. Therefore, it is possible to considerably reduce the duration of the off-phases during which the coil is practically disconnected from the power supply source, and thus increase the frequency of the control signals above the audio frequency band. Moreover, this enhances the precision of control of the speed of the motor.

Figure 3:
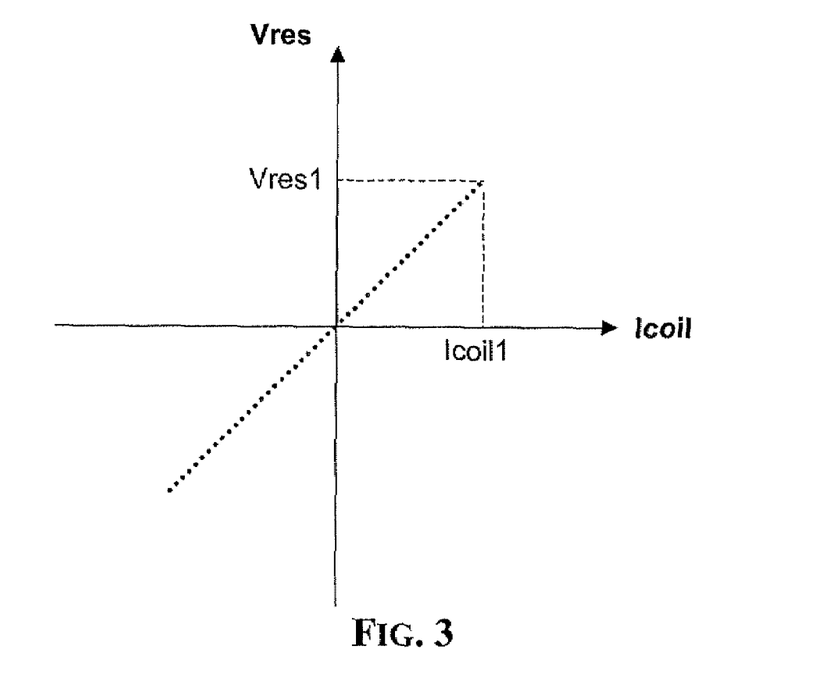
FIG. 3 shows a linear interpolation characteristic between the initial amplitude of the voltage disturbance and the maximum current flowing through the coil during an on-phase according to the present invention.

According to a first embodiment, the amplitude of the voltage disturbance Vres is proportional to the value of the current flowing through the coil Icoil at the end of the on-phase, according to the characteristic depicted in FIG. 3.

During a preliminary calibration phase, the amplitude of the voltage disturbance Vres1 is sensed as a correspondence of a certain current Icoil1 forced through the coils of the VCM while keeping it still. For a VCM that swings an arm carrying the heads of a hard disk, this may be easily done by positioning the arm such that the heads are on the parking ramp and forcing a current in the coils so as to pull the arm against the end stop of the parking ramp. Therefore, the residual voltage is estimated as a correspondence of any other value of the current according to the following formula:

$$Vres = \frac{Vres1}{Icoil1} \cdot Icoil \qquad (1)$$

This first technique is very easy and fast and allows an increase in the switching frequency by controlling with good precision the motor.

Figure 4:
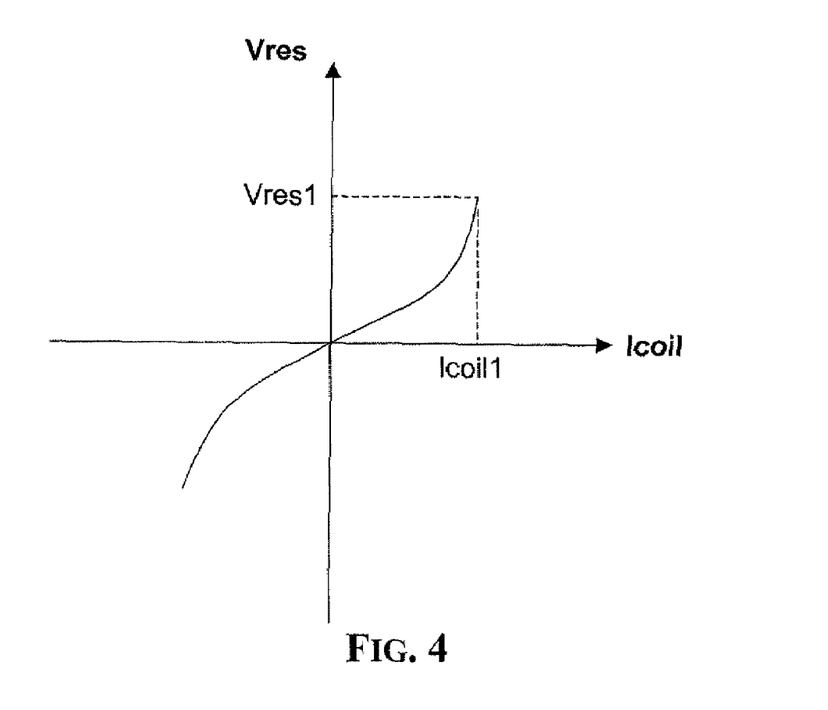
FIG. 4 shows the characteristic of the maximum current flowing through the coil and the initial amplitude of the voltage disturbance according to the present invention.
Figure 5:
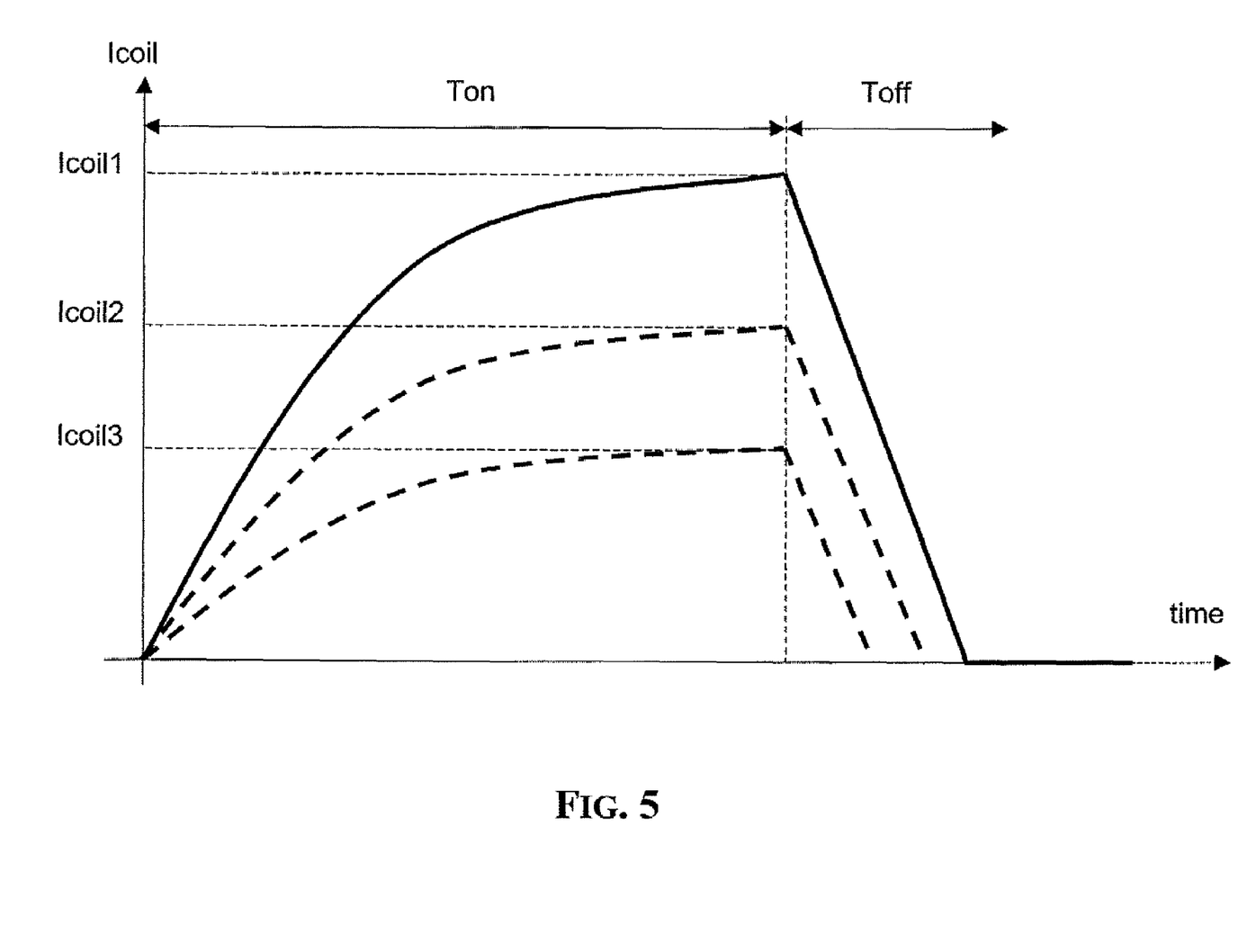
FIG. 5 shows various waveforms of the current flowing through the coil during an on-phase and the successive off-phase according to the present invention.

A complication is that the voltage-current characteristic is nonlinear, as depicted in FIG. 4. This is essentially due to the fact that waveforms of the current flowing through the VCM, when the frequency varies, are not proportional among them. Indeed, as shown in FIG. 5, when the coil is tristated, the times necessary for nullifying the current increases with the amplitude (Icoil1, Icoil2, Icoil3) of the same at the end of the on-phase.

Figure 6:
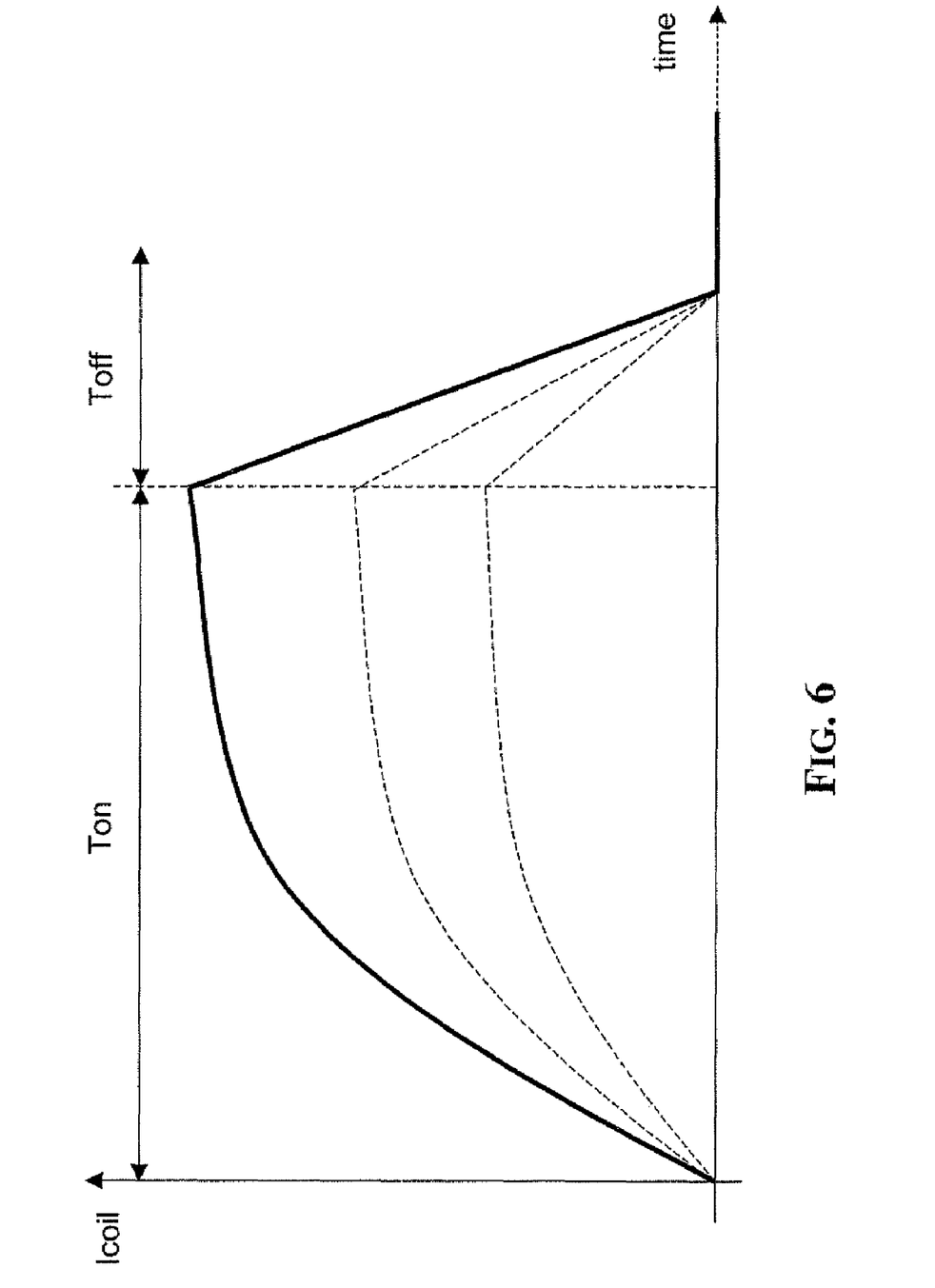
FIG. 6 depicts ideal waveforms of the current flowing through the coil during an on-phase and the successive off-phase for estimating the voltage disturbance with a linear model according to the present invention.
Figure 7:
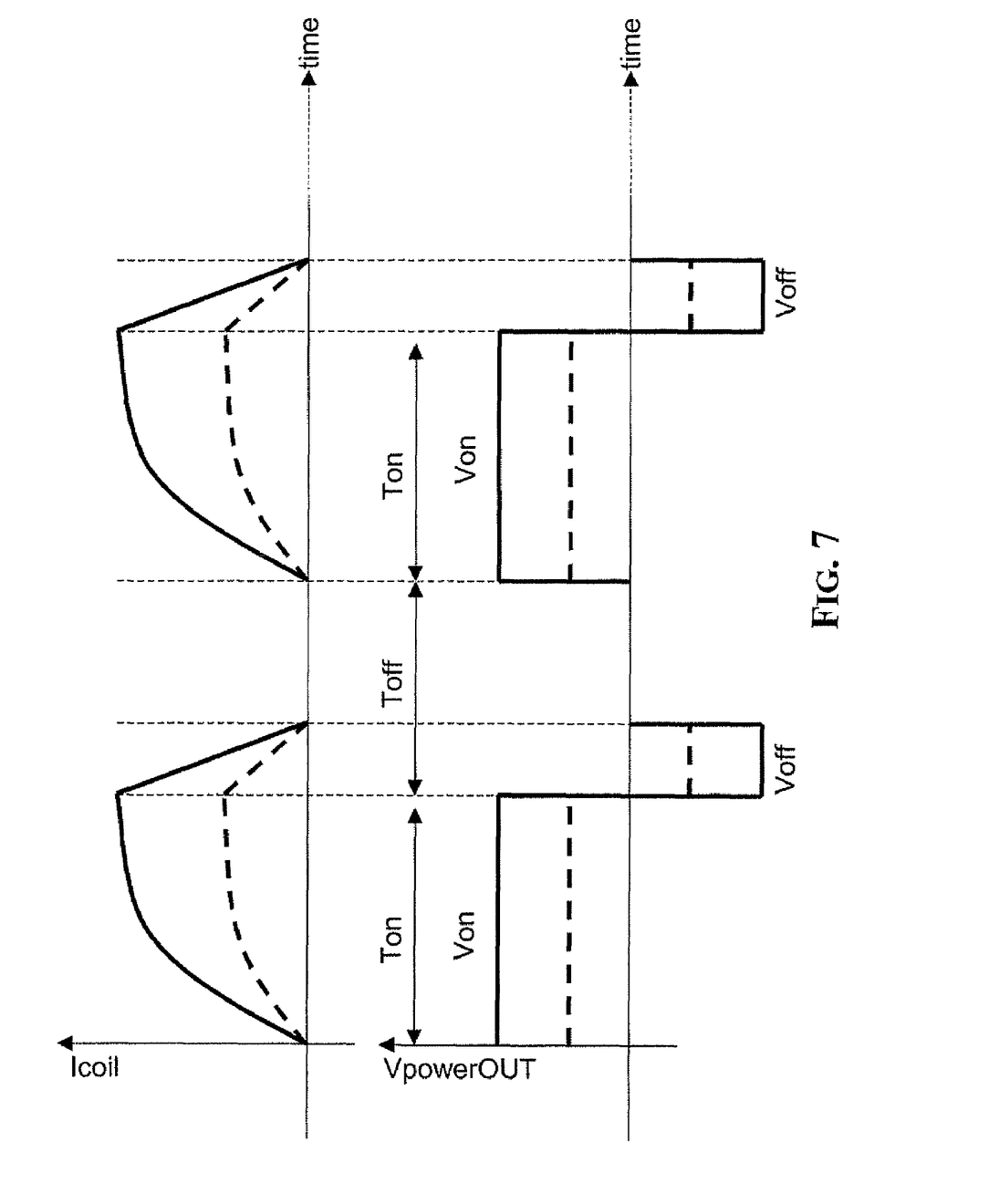
FIG. 7 depicts waveforms of the current flowing through the coil and of the output voltage during successive on and off-phases according to the present invention.

The method of the invention may be made even more accurate by driving the VCM such that the waveforms of the current are of the kind depicted in FIG. 6, wherein the time for nullifying the current in the coil is constant. As schematically illustrated in FIG. 7, when the motor is tristated, the coil is first counterbiased with a voltage value of opposite sign in respect to the supply voltage in the period $T_{ON}$, so as to nullify the current Icoil in a substantially constant pre-established time, before being finally tristated. Therefore, the waveforms of the current flowing through the VCM are proportional among them, thus equation (1) is very accurate.

According to a third embodiment, in a calibration phase a look-up table is preliminarily created, wherein pre-established values of the current flowing through the coil at the end of the on-phase are associated to corresponding measured values of the amplitude of the voltage disturbance. This look-up table is stored in a dedicated memory accessible by the control circuit of the VCM. At the end of the on-phase, as a function of the current flowing through the coil, a corresponding estimated value of the voltage disturbance is determined by using the look-up table.

With this embodiment of the method, very accurate estimations are obtained by using a dedicated memory for storing the look-up table at which the control circuit of the motor access at the end of each on-phase. When the amplitude of the current pulses forced through the coil undergoes substantial variations from an on-phase to the next, the performance at high switching frequencies degrade.

Figure 8:
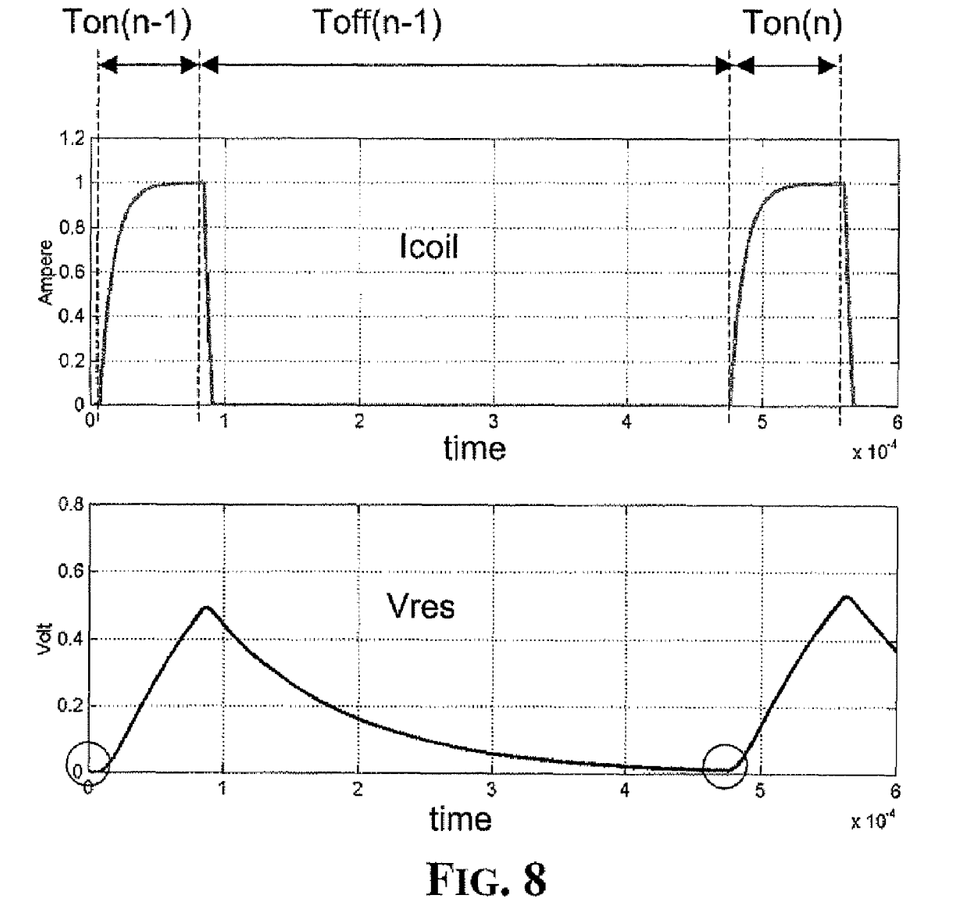
FIGS. 8 and 9 depict typical waveforms of the voltage disturbance when the driving current pulses are relatively distant one from the other according to the present invention.
Figure 9:
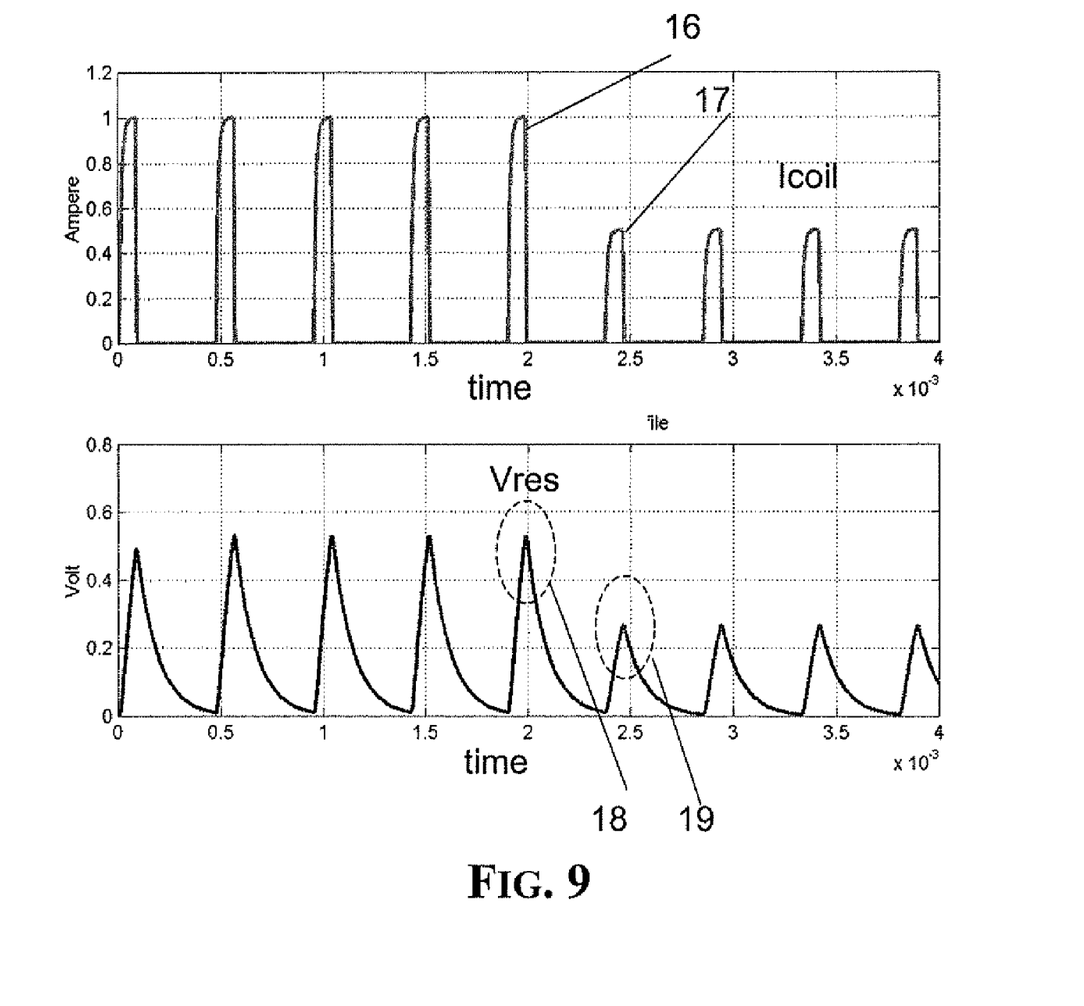

This may be explained by referring to FIGS. 8 and 9. If the current pulses are sufficiently spaced one from the other, the voltage disturbance nullifies during the off-phase between successive on-phases. As shown in FIG. 9, if the amplitude of the pulse 17 flowing through the motor in the current on-phase is smaller than the amplitude of that forced during the previous on-phase 16, the voltage disturbance 19 at the end of the on-phase reaches a value different from that (18) reached at the end of the previous on-phase. If the current pulses in the successive on-phases are identical to the pulse 17, the voltage disturbance reaches always the same value (19). The voltage disturbance remains substantially proportional to the maximum value of the current forced through the coil, even after relatively large variations of the current pulse forced through the coil.

Figure 10:
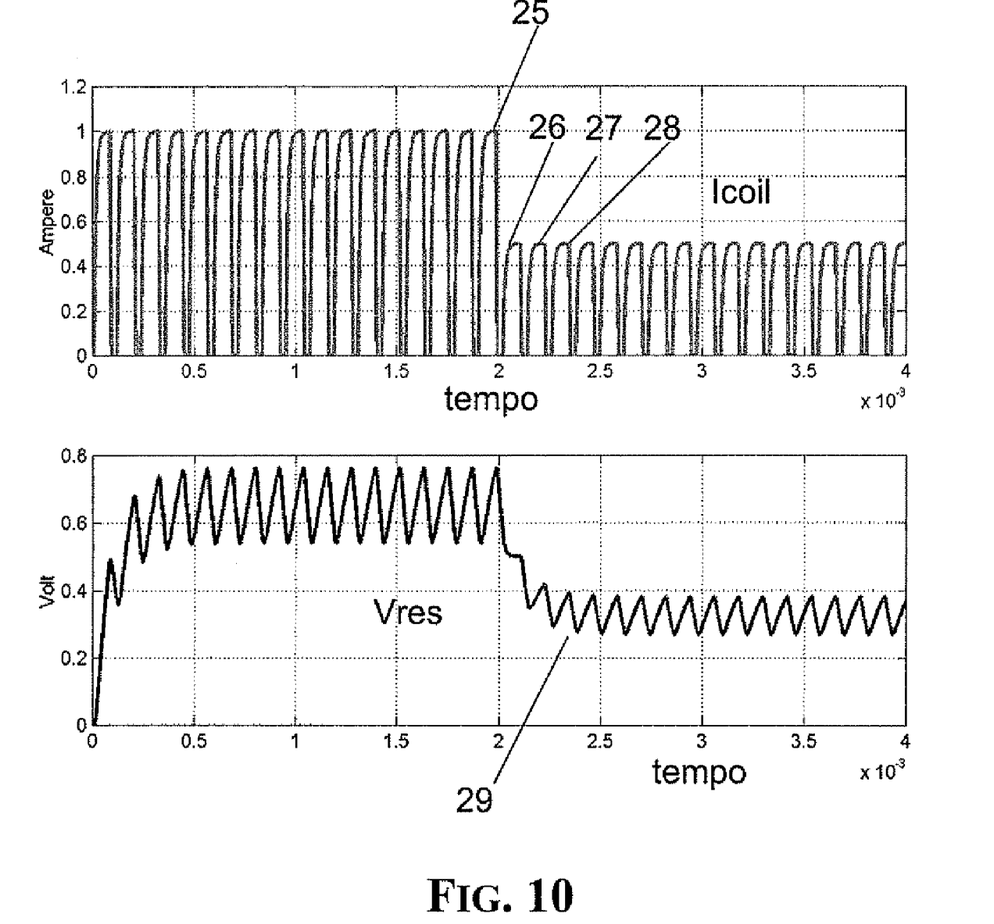
FIGS. 10 and 11 depict typical waveforms of the voltage disturbance when the driving current pulses are relatively close to one another according to the present invention.

In contrast, if the current pulses are separated by relatively short off-phases, as depicted in FIG. 10, the voltage disturbance may not nullify itself before a new on-phase starts. Therefore, in presence of substantial variations of the amplitude of current pulses (pulses 25 and 26), the amplitude of the voltage disturbance at the end of an on-phase varies and reaches a stable value (29) only after several on-phases with pulses of same amplitude (27 and 28). Such a stabilized value of voltage disturbance may be estimated with the methods described above.

Figure 11:
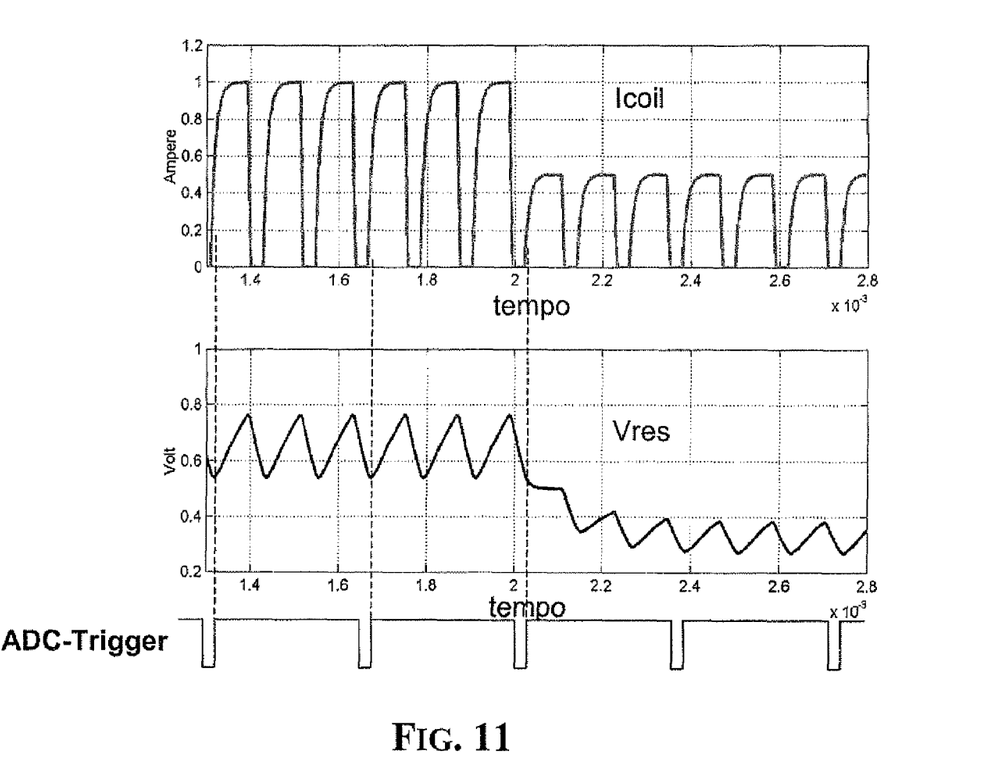

To improve further the driving precision of the VCM, it is convenient to stop estimating the back electromotive force after a substantial variation of the amplitude of the current pulses has occurred, and after a certain number N of off-phases and consider it constant and equal to the last determined value thereafter, An easy way to do it is shown in FIG. 11. Substantially, an enabling pulse ADC-T$_{RIGGER}$ for the analog-to-digital converter ADC is generated for converting the voltage sensed on the nodes of the coil in an off-phase every N periods.

Tests carried out show that, in all cases of practical interest, it is sufficient to wait N =3 or 4 off-phases after a substantial variation of the amplitude of the current pulse, for obtaining a voltage disturbance Vres that assumes the same value at the end of subsequent on-phase, as clearly shown in FIGS. 10 and 11.

This number N may be heuristically determined during a test phase, or it may be estimated as a function of construction parameters of the motor and/or representative of the driving condition, such as for example the inductance and the resistance of the coil, the ratio between the duration of the on-phases and the duration of the off-phases, and the characteristic of magnetization of the permanent magnet of the voice-coil motor, etc.

The number N may also be established from time to time by the system microprocessor μP of FIG. 1, as a function of the driven load. In a calibration phase the number of off-phases necessary for obtaining a value Vres1 of equation (1), or values to be stored in the look-up table, stable within certain pre-established limits, is counted. To this end, during a calibration phase in which the rotor of the motor is still, a current Ires1 is forced through the coil, the value Vres is sensed at the beginning of the successive off-phase and these two operations are repeated for a plurality of consecutive periods. When the value assumed by the difference between the voltage disturbance Vres[K], sensed at the beginning of the K-th off-phase and the voltage disturbance Vres[K−1], sensed at the beginning of the (N−1)-th off-phase is smaller than a pre-established threshold, then the value of Vres1 equal to Vres[K] is determined and a number N of consecutive off-phases equal to K is established.

Preferably, a maximum value of consecutive off-phases should be assigned to N for preventing, because of measurement errors due to electrical noise, the procedure for determining the value Vres1 could be endless.

Waiting for a certain number of on-phases after a substantial variation of the amplitude of the pulses of the current forced through the coil is a useful expedient for enhancing precision of the control system of a VCM, wherein the back electromotive force is estimated by sensing the voltage on the nodes of the coil. In general, any control system of a VCM that estimates the back electromotive force by sensing the voltage on the nodes of the coil is sensed while the voltage disturbance is not yet null, may be made more precise by disabling the sensing amplifier of the voltage on the coil for a certain number N of cut off cycles successive to a variation, from an on-phase to the other, of the amplitude of the current pulse forced through the coil, the absolute value of which exceeds a pre-established threshold.

That which is claimed:

1. A method for determining a back electromotive force induced in a coil of a voice-coil motor by its motion, driven in a discontinuous mode by commanding alternating on-phases and off-phases, the method comprising:

sensing a drive current flowing in the coil or a drive voltage on the coil at an end of an on-phase;

estimating an amplitude of a voltage disturbance induced in the coil by mutual induction between a permanent magnet of the voice-coil motor and the moving coil as a function of the sensed drive current or drive voltage;

sensing voltage on the coil during a following off-phase with no current flowing in the coil; and determining the back electromotive force induced in the moving coil as a difference between the sensed voltage and the estimated amplitude of the voltage disturbance.

2. The method according to claim 1, wherein the voltage disturbance is estimated proportionally to the sensed drive current or drive voltage.

3. The method according to claim 2, further comprising counterbiasing the coil in an initial interval of a duration of the off-phase for the drive current to become null before tristating the coil.

4. The method according to claim 1, further comprising creating a look-up table of amplitudes of the voltage disturbance sensed for different values of the drive current flowing through the coil at an end of an on-phase for estimating the voltage disturbance by reading a voltage in the table associated to the sensed drive current or drive voltage.

5. The method according to claim 4, wherein the amplitudes of the voltage disturbances to be recorded in the look-up table are sensed by forcing a current in the coil while keeping it still.

6. The method according to claim 1, further comprising:
comparing with a threshold an absolute value of the difference between the drive current flowing through the coil or the drive voltage applied to the coil at the end of an on-phase and the absolute value at an end of a previous on-phase; and
if the threshold is exceeded, then the back electromotive force is considered constant and equal to a last determined value for a number of successive off-phases.

7. The method according to claim 6, wherein the number of successive off-phases is established as a function of the absolute value of the difference.

8. The method according to claim 6, further comprising disabling the sensing of the voltage on the nodes of the coil for the number of successive off-phases when the threshold is exceeded.

9. A method for determining a back electromotive force induced in a coil of a voice-coil motor by its motion, driven in a discontinuous mode by commanding alternating on-phases and off-phases, the method comprising:
sensing an electrical condition of the coil at an on-phase;
estimating a voltage disturbance induced in the coil by mutual induction between a permanent magnet of the voice-coil motor and the moving coil as a function of the sensed electrical condition;
sensing voltage on the coil during a following off-phase with no current flowing in the coil; and
determining the back electromotive force induced in the moving coil as a difference between the sensed voltage and the estimated voltage disturbance.

10. The method according to claim 9, wherein the sensed electrical condition is based upon a drive current flowing in the coil.

11. The method according to claim 9, wherein the sensed electrical condition is based upon a drive voltage on the coil at an end of the on-phase.

12. The method according to claim 9, wherein estimating the voltage disturbance comprises estimating an amplitude thereof.

13. The method according to claim 9, wherein the voltage disturbance is estimated proportionally to the sensed electrical condition.

14. The method according to claim 11, further comprising counterbiasing the coil in an initial interval of a duration of the off-phase for the drive current to become null before tristating the coil.

15. The method according to claim 12, further comprising creating a look-up table of amplitudes of the voltage disturbance sensed for different values of drive current flowing through the coil at an end of an on-phase for estimating the voltage disturbance by reading a voltage in the table associated to the sensed electrical condition.

16. The method according to claim 15, wherein the amplitudes of the voltage disturbances to be recorded in the look-up table are sensed by forcing a current in the coil while keeping it still.

17. The method according to claim 9, further comprising:
comparing with a threshold an absolute value of the difference between the drive current flowing through the coil or the drive voltage applied to it at the end of an on-phase and the absolute value at an end of a previous on-phase; and
if the threshold is exceeded, then the back electromotive force is considered constant and equal to a last determined value for a number of successive off-phases.

18. The method according to claim 17, wherein the number of successive off-phases is established as a function of the absolute value of the difference.

19. The method according to claim 17, further comprising disabling the sensing of the voltage on the nodes of the coil for the number of successive off-phases when the threshold is exceeded.

20. A method for driving in a discontinuous mode a voice-coil motor by alternating on-phases, during which a drive current flows through the coil, to off-phases during which the coil is tristated, the method comprising:
sensing voltage on the coil during off-phases with no current flowing in the coil;
sensing the drive current flowing through the coil or the drive voltage applied to the coil at an end of an on-phase;
determining a back electromotive force induced in the moving coil as a function of the sensed drive voltage on the coil during off-phases;
forcing in the coil a current pulse having an amplitude and a duration determined as a function of the determined back electromotive force;
comparing with a threshold an absolute value of a difference between the drive current flowing through the coil or the drive voltage applied to the coil at the end of the on-phase and the value at an end of a previous on-phase; and
if the threshold is surpassed, then the back electromotive force is considered constant and equal to a last determined value for a number of successive off-phases.

21. The method according to claim 20, wherein the number of successive off-phases is established as a function of the absolute value of the difference.

22. The method according to claim 20, further comprising disabling the sensing of the voltage on the nodes of the tristated coil for the number of successive off-phases when the threshold is exceeded.

23. An apparatus comprising:
a voice-coil motor (VCM) comprising a permanent magnet, and a coil adjacent said permanent magnetic;
a microprocessor coupled to said VCM for determining a back electromotive force induced in said coil by its motion, and for driving said VCM in a discontinuous mode by commanding alternating on-phases and off-phases;

an operational amplifier coupled to said VCM for sensing an electrical condition of said coil at an on-phase;

an analog-to-digital converter coupled to an output of said operational amplifier for digitizing the sensed electrical condition;

said microprocessor coupled to an output of said analog-to-digital converter for estimating a voltage disturbance induced in said coil by mutual induction between said permanent magnet and said moving coil as a function of the digitized sensed electrical condition;

said operational amplifier sensing voltage on said coil during a following off-phase with no current flowing in said coil; and said microprocessor determining the back electromotive force induced in said moving coil as a difference between the sensed voltage and the estimated voltage disturbance.

24. The apparatus according to claim 23, wherein the sensed electrical condition is based upon a drive current flowing in said coil.

25. The apparatus according to claim 23, wherein the sensed electrical condition is based upon a drive voltage on said coil at an end of the on-phase.

26. The apparatus according to claim 23, wherein estimating the voltage disturbance comprises estimating an amplitude thereof.

27. The apparatus according to claim 23, wherein the voltage disturbance is estimated proportionally to the sensed electrical condition.

28. The apparatus according to claim 27, wherein said microprocessor counterbiases said coil in an initial interval of a duration of the off-phase for the drive current to become null before tristating said coil.

29. The apparatus according to claim 26, wherein said microprocessor creates a look-up table of amplitudes of the voltage disturbance sensed for different values of drive current flowing through said coil at an end of an on-phase for estimating the voltage disturbance by reading a voltage in the table associated to the sensed electrical condition.

30. The apparatus according to claim 29, wherein the amplitudes of the voltage disturbances to be recorded in the look-up table are sensed by said operational amplifier when a current is forced in said coil while keeping it still.

31. The apparatus according to claim 23, wherein said microprocessor compares with a threshold an absolute value of the difference between the drive current flowing through said coil or the drive voltage applied to said coil at the end of an on-phase and the absolute value at an end of a previous on-phase; and if the threshold is exceeded, then the back electromotive force is considered constant and equal to a last determined value for a number of successive off-phases.

32. The apparatus according to claim 31, wherein the number of successive off-phases is established as a function of the absolute value of the difference.

33. The apparatus according to claim 31, wherein said micrprocessor disables the sensing of the voltage on the nodes of the tristated coil for the number of successive off-phases when the threshold is exceeded.

* * * * *

UNITED STATES PATENT AND TRADEMARK OFFICE
CERTIFICATE OF CORRECTION

PATENT NO. : 7,486,039 B2
APPLICATION NO. : 11/567413
DATED : February 3, 2009
INVENTOR(S) : Michele Boscolo Berto It is certified that error appears in the above-identified patent and that said Letters Patent is hereby corrected as shown below:

Column 6, Line 3    Delete: "mined value thereafter, An easy way to do it is shown in FIG."
Insert: -- mined value thereafter. An easy way to do it is shown in FIG. --

Column 10, Line 27    Delete: "micrprocessor disables the sensing of the voltage on the nodes"
Insert: -- microprocessor disables the sensing of the voltage on the nodes --

Signed and Sealed this

Eleventh Day of August, 2009

David J. Kappos
*Director of the United States Patent and Trademark Office*